United States Patent [19]

Jenkel et al.

[11] Patent Number: 5,113,583
[45] Date of Patent: May 19, 1992

[54] INTEGRALLY BLADED ROTOR FABRICATION

[75] Inventors: Steven D. Jenkel, Royal Palm Beach; Donald G. MacNitt, Jr., Singer Island; Bryant H. Walker, Palm City, all of Fla.

[73] Assignee: United Technologies Corporation, Hartford, Conn.

[21] Appl. No.: 582,278

[22] Filed: Sep. 14, 1990

[51] Int. Cl.⁵ .............................................. B23P 15/04
[52] U.S. Cl. ............................... 29/889.21; 29/889; 29/428; 228/193; 416/213 R; 416/244 R
[58] Field of Search ............... 29/889.21, 889, 428; 228/193; 148/11.5 Q, 11.5 R, 11.5 P, 11.5 N, 12 R; 416/213 R, 244 R

[56] References Cited

U.S. PATENT DOCUMENTS

| | | | |
|---|---|---|---|
| 3,519,503 | 7/1970 | Moore et al. | 148/11.5 |
| 3,873,234 | 3/1975 | Penny | 416/97 |
| 3,905,723 | 9/1975 | Torti | 416/241 |
| 4,051,585 | 10/1977 | Walker et al. | 29/156.8 R |
| 4,074,559 | 2/1978 | Beane et al. | 72/354 |
| 4,265,105 | 5/1981 | MacNitt et al. | 72/354 |
| 4,479,293 | 10/1984 | Miller et al. | 29/156.8 R |
| 4,529,452 | 7/1985 | Walker . | |
| 4,568,516 | 2/1986 | Adlerborn et al. | 419/26 |
| 4,680,160 | 7/1987 | Helmink | 419/6 |
| 4,864,706 | 9/1989 | Jenkel | 29/156.8 R |
| 4,873,751 | 10/1989 | Walker et al. | 29/156.8 B |

Primary Examiner—Irene Cuda
Attorney, Agent, or Firm—Herbert W. Mylius

[57] ABSTRACT

A method is taught for the isostatic forging of integrally bladed rotors, in which deformable hollow single crystal blades are protected from deformation during diffusion bonding to the disk by encapsulation in a ceramic protective shell. The ceramic shell serves to occupy the areas between the blades and the surrounding forging die set, so that during application of high temperatures and pressures, damage to the blades is prevented without the use of complex segmented die assemblies.

24 Claims, 8 Drawing Sheets

INTEGRALLY BLADED ROTOR FABRICATION

TECHNICAL FIELD

This invention relates to the preparation of integrally bladed rotors, and particularly to the process of fabricating integral, multi-alloy metallic components.

BACKGROUND ART

Gas turbine power plants are used as the primary power source for aircraft, in the form of jet engines and turboprop engines, as auxiliary power sources for driving air compressors, hydraulic pumps, etc. on aircraft, and as stationary power supplies such as backup electrical generators, for hospitals and the like. The temperatures and stresses to which most gas turbine engine components are subjected require that such components be fabricated of high strength, high temperature materials, such as superalloys and titanium alloys.

The design, construction and materials of rotors for gas turbine engines often dictate operating limits for the turbines in which they are employed. Extensive efforts have been made over the years to develop new alloys, new fabrication techniques, and new component designs which permit operation of these rotors at higher operating temperatures and/or lead to lighter weight, longer lived components, with all their attendant advantages. The most common rotor design used today in high temperature, high speed applications, such as in gas turbine engines for jet aircraft, comprises a disk with blades or airfoils mechanically attached to the rim thereof. The alloy used for the disk is selected to meet the requirements of high tensile strength and good low cycle fatigue resistance. Such properties are found in, for example, fine equiaxed grain superalloy materials. The airfoils, which are exposed to the higher temperatures of the gas path, as well as higher centrifugal loads, are stress rupture and creep limited. Thus, the blades are commonly produced from suitable materials having good stress rupture and creep resistance, such as coarse grained materials. No alloy processed to a singular microstructure can give optimum properties demanded by the conditions encountered in both the disk and airfoil sections without requiring excessive weight. One piece, integral centrifugal rotors, such as radial inflow turbine rotors, pose similar problems.

There are many techniques disclosed in the prior art for fabricating integrally bladed rotors using different materials for the blades and the hub or disk. The phrase "different materials", as used in this specification, refers to materials having different properties but which may or may not have the same elemental composition. Thus, alloys having the same composition but which are processed differently so as to exhibit differing properties are considered to be "different materials". One such technique was to diffusion bond blades of one material to a disk of another material, using hot isostatic pressing. In U.S. Pat. Nos. 4,096,615 and 4,270,256 it was recognized that maintaining precise dimensional controls between adjacent airfoil components was a difficult problem. Both patents include relatively complex procedures for forming an integral ring of blades, the radially inward facing surface of which is machined to a highly precise diameter to form a bonding surface with the radially outward facing surface of a rotor disk made from a different material. The ring and disk are positioned in mating relationship, oxygen and other contaminants are removed by vacuum outgassing, and external joint lines are sealed with braze material. Hot isostatic pressing is then used to diffusion bond the blades to the disk. Aside from the difficulties encountered in positioning the blades about the disk prior to hot isostatic pressing, prior art diffusion bonding techniques have not consistently resulted in satisfactory solid state bonds.

A more recent development is the Gatorizing ® isothermal forging method useful with high temperature superalloys, as described in commonly owned U.S. Pat. No. 3,519,503, the teachings of which may be used in conjunction with commonly owned U.S. Pat. Nos. 4,074,559 and 4,265,105, which describe apparatus which may be used to forge integrally bladed rotors from superalloys. Other patents relevant to the fabrication of dual material rotors include U.S. Pat. Nos. 2,479,039; 2,703,922; 2,894,318; 3,047,936; 3,598,169; 3,905,723; 4,051,585; 4,063,939; 4,097,276; 4,175,911; and 4,529,452.

A recent trend is to use single crystal turbine blades, as described for example in U.S. Pat. Nos. 3,494,709, 4,116,723, and 4,209,348, because of their exceptional high temperature mechanical properties. U.S. Pat. No. 4,592,120 suggests that such single crystal blades might be fabricated into an integrally bladed rotor by a casting method wherein a liquid metal would be poured into a mold containing preformed single crystal blades held in spaced alignment with a central disk portion. This approach has the inherent difficulty of limiting the disk rim properties to those of cast materials, whereas it is well known that forged materials provide better overall properties for disk applications.

Another technique for preparation of integrally bladed rotors is more fully described in a paper entitled "Fabrication and Heat Treatment of a Nickel-Base Superalloy Integrally Bladed Rotor for Small Gas Turbine Applications" by Hughes, Anderson, and Athey, published Jun. 22, 1980 in *Modern Developments in Powder Metallurgy, Volume* 14, *Special Materials*, published by Metal Powder Industries Foundation. In this paper the fabrication of an integrally bladed rotor by the previously mentioned Gatorizing process using a single alloy throughout is discussed.

Still another method for the preparation of integrally bladed rotors is disclosed in U.S. Pat. No. 4,529,452, wherein a turbine disk, made from a metal alloy which has been processed to exhibit superplastic properties at elevated temperatures, is diffusion bonded to turbine blades made from another metal alloy, by disposing the components in a press in mating contact. After forging at a high temperature, the surfaces are diffusion bonded. The new integral assembly is then heat treated to obtain the desired properties.

In U.S. Pat. 4,864,706, fabrication methods are described for producing an integrally bladed rotor wherein single crystal blade portions are securely metallurgically bonded to a polycrystalline disk. In this instance, individual single crystal blades are bonded to forged protrusions on the disk. In this and other prior art techniques, problems have been encountered in the fixturing and positioning of individual blades during solid-state diffusion bonding. Elaborate fixturing approaches can accommodate positioning requirements but suffer from low through-put since blades are generally individually fixtured and bonded, an extremely time consuming and manpower intensive procedure.

SUMMARY OF THE INVENTION

The present invention relates to a method for joining single crystal blades to a forged or powder metallurgically formed disk utilizing high temperature and pressure to achieve a metallurgical bond. It is an object of the present invention to provide a method for the economical production of metallurgically bonded blade and disk assemblies without the requirement of separate, individual locating fixtures to bond individual blades to the disk.

It is a further object of the invention to encase bladed rings within a cast ceramic shell so that the bladed ring can be supported within an isothermal forging die set for the purpose of diffusion bonding to a disk or hub material. The ceramic shell protects the blades and allows the use of simple die shapes without requiring accommodation of blade geometry within the die cavity.

These and other objects of the invention are achieved through the use of a cast ceramic shell about the blade ring during the forging step which results in the bonding of the blade assembly to the disk assembly. In accordance with the present invention, a wrought powder metallurgy disk is positioned inside a cast bladed ring, the disk/ring interface is evacuated and sealed to prepare for diffusion bonding, and the blades are then encased in a cast ceramic shell. The encased ring and disk or hub are then placed in a forging die, the cavity of which is designed to compensate for differences in thermal expansion between the ceramic material and the die material. The assembly is then heated, and sufficient load is applied to create a diffusion bond at the ring/hub interface. After bonding, the component is removed from the die and the ceramic shell is broken or machined away. The rotor, with hub and blades integrally bonded, may then be heat treated and any final machining, including the opening of internal cooling passages, can be performed.

DETAILED DESCRIPTION OF THE INVENTION

Figure 1:
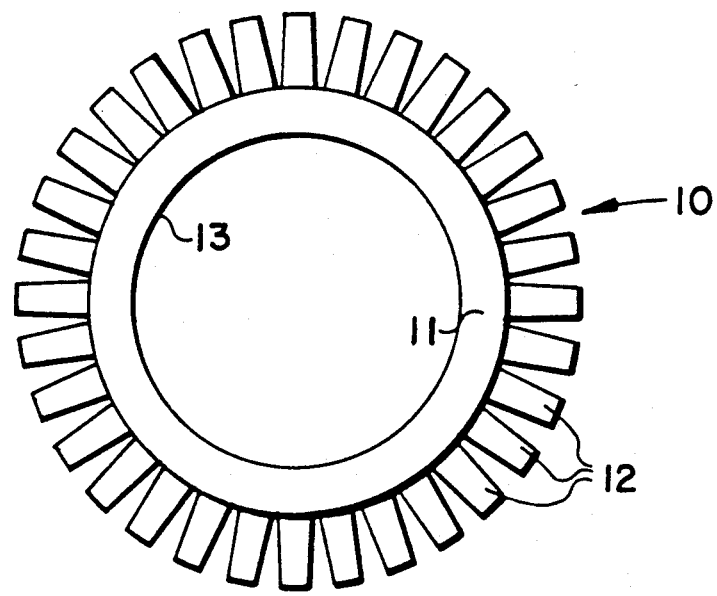
FIG. 1 is a top view of a blade ring assembly provided with an array of radially extending blades.
Figure 2:
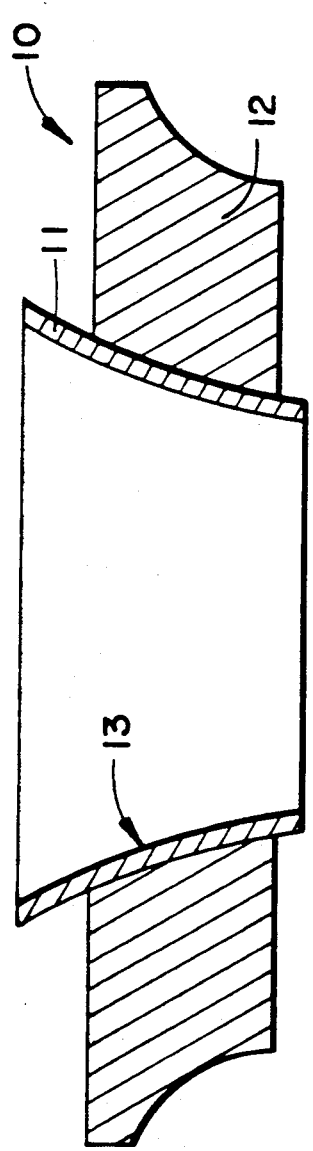
FIG. 2 is a cross-sectional view of the blade ring assembly of FIG. 1.

With reference to FIGS. 1 and 2, there is illustrated a blade ring assembly 10, generally comprising a ring, 11, provided with an annular array of equally spaced apart radially extending blades, 12, mounted around its radially outer periphery, and having an inwardly facing bonding surface 13. The bladed ring 10 may be fashioned by any convenient method. For example, the bladed ring may be machined from a cast piece of material, although this would be prohibitively expensive. The ring many also be fabricated by assembling an annular array of blades having platforms so that the platforms of adjacent blades abut, and then bonding the abutting blades together by, for example, electron beam welding. Alternatively, it may be fabricated by forming a ring having a plurality of blade cross-section slots in its periphery, inserting blades of corresponding cross-section shape in the slots and subsequently fixing the blades in the slots by electron beam welding or other suitable means.

A preferred method for the preparation of the ring assembly is that referred to as the bi-cast technique, whereby single crystal blades with the desired cooling configuration and crystallographic orientation are cast individually, and then bi-cast into a blade ring for subsequent bonding to the hub material. Using this technique, one is able to prepare blades of complex cooling capability and material crystallographic orientation. For example, one may tailor make airfoil blades which transition from a single crystal of preferred orientation at the blade tip, to a coarse grain polycrystalline structure blade body, to an intermediate polycrystalline blade base, in order to tailor mechanical properties to meet very high temperature and stress gradients within the rotor from blade tip to disk centerline. To enhance temperature capabilities the individual airfoils or blades may be air cooled with internal air passages, the cooling air being introduced via plenum chambers located at the root of each blade in the disk rim. The blade ring, may be cast of a suitable nickel-base superalloy, such as Mar-M-247, to position the individually cast airfoils or blades in the appropriate relationship.

Blade elements are fabricated having the desired crystallographic grain orientation from materials having suitable strength and temperature properties. Superalloys are preferred, and even required for state of the art gas turbine engines which have turbine inlet temperatures of above about 2000° F. The term superalloys, as employed herein, shall include nickel- or cobalt-base alloys with chromium, titanium, aluminum, and refractory metal alloy additions. Nickel is the preferred base material. Each individual blade, 12, is preferably fabricated of nickel base superalloy which has been processed to produce a single crystal structure of the desired crystallographic orientation (for example, <112> or <111>) so as to yield optimum blade mechanical properties for the particular rotor application and design. After formation of the blade ring, e.g., by the "bi-cast" technique, the ring must be bonded to a disk preform of the appropriate material, which is preferably a wrought superalloy.

The hub or disk preform is fashioned of a material which has been preconditioned to give it low strength and high ductility, as described in commonly owned U.S. Pat. No. 3,519,503, incorporated herein by reference. This reference teaches that a preferred preconditioning method consists of extruding a compacted powder billet through a die to produce a reduction in cross-sectional area of at least 4:1, and preferably at least 6:1, at a temperature below but within about 450° F. of the normal recrystallization temperature of the material. Such processing produces a material which exhibits low stress and high ductility. Exemplary materials, and their recrystallization temperatures, include the following nominal compositions, all percentages given in weight percent:

AF2-IDA (2130° F.) 12.0% Cr, 10.0% Co, 0.33% C, 3.0% Ti, 4.5% Al, 3.0% Mo, 0.015% B, 1.5% Ta, 6.0% W, 0.10% Zr, Bal Ni.

IN 100 (2100° F.) 10% Cr, 15% Co, 4.5% Ti, 5.5% Al, 3% Mo, 0.17% C, 0.75% V, 0.015% B, 0.05% Zr, Bal Ni.

Waspaloy (1850° F.) 19.5% Cr, 13.5% Co, 0.07% C, 3.5% Ti, 1.4% Al, 4% Mo, 0.005% B, 0.08% Zr, Bal Ni.

Astroloy (2050° F.) 15.5% Cr, 17% Co, 0.07% C, 3.5% Ti, 4.0% Al, 5.0% Mo, 0.025% B, Bal Ni.

Ti 8-1-1 (1600° F.) 7.9% Al, 1.0% Mo, 1.0% V, Bal Ti.

Ti 6-4 (1400° F.) 6.0% Al, 4.0% V, Bal Ti.

Figure 3:
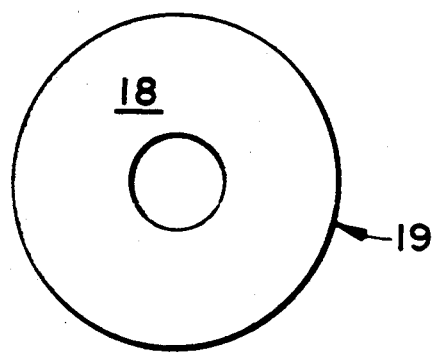
FIG. 3 illustrates a disk preform suitable for use in this invention.
Figure 4:
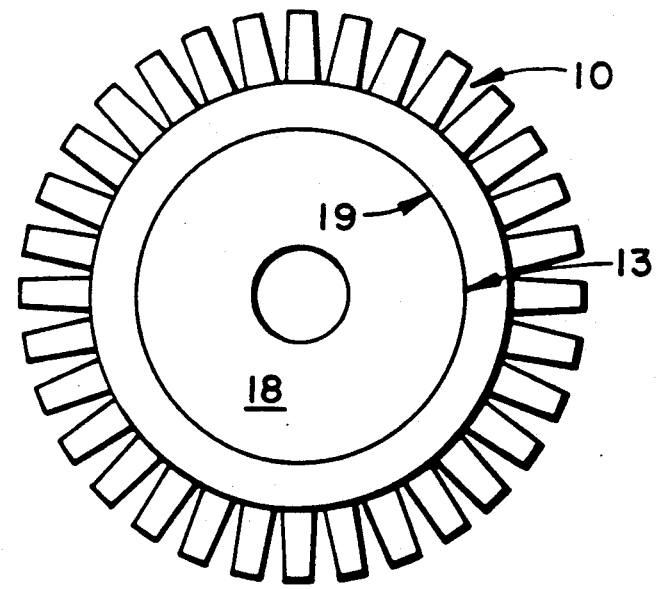
FIG. 4 is a view of a bladed ring positioned about the disk preform of FIG. 3, to which it is to be bonded.
Figure 5:
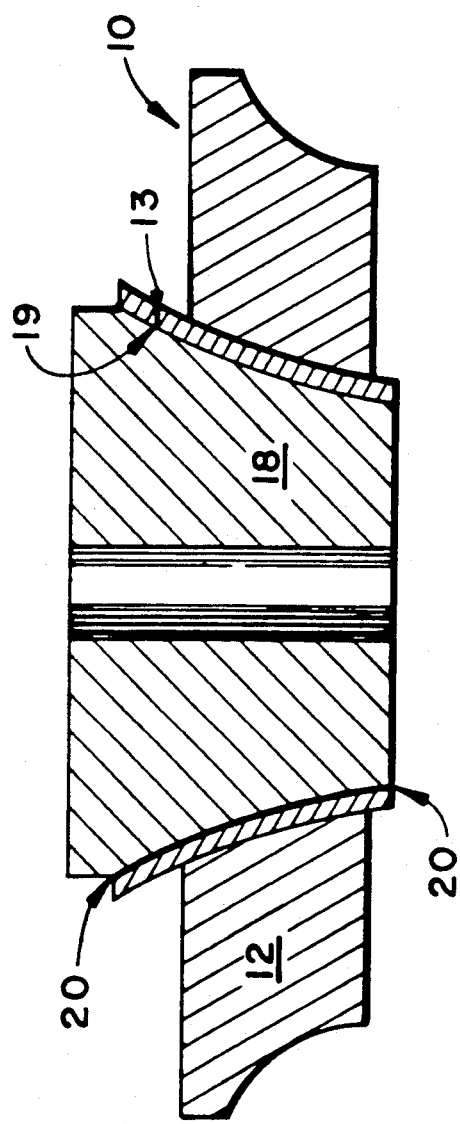
FIG. 5 shows a bladed ring positioned about a disk preform, in cross-sectional view.

The materials suitable for use as the hub or disk of an integrally bladed rotor in accordance with this invention exhibit superplasticity and low ductility only at elevated temperatures, and require relatively high applied forces for forging. A preferred material is AF2-IDA, a nickel-base superalloy. Another preferred nickel-base superalloy is IN-100, although the selection of the specific material from which the disk or hub is to be fabricated is dependent upon the required properties of the rotor to be formed. The disk preform, 18, illustrated in FIG. 3, is provided in the form of a billet of preconditioned alloy of the appropriate dimension, having outwardly facing bonding surface 19. As shown in FIGS. 4 and 5, the blade ring assembly 10 is positioned about the periphery of disk 18, such that inwardly facing bonding surface 13 mates with the outwardly facing bonding surface 19 of the disk preform. The opposing surfaces may be circumferentially brazed at intersections 20, after degassing, to prevent contamination. In accordance with the present invention, the bladed ring and disk assembly is then subjected to forge joining to diffusion bond surfaces 13 and 19 so as to create a solid state diffusion bond.

However, it has been found in the past that when blade and disk assemblies are subjected to forge bonding pressures, deformation of the blade or blade segments often occurs, particularly when said blades or blade assemblies are hollow and/or fashioned of single crystal material. The present invention overcomes this problem by providing a protective shell of a ceramic material about the blades or blade elements during the forge joining step.

The ceramic shell of the present invention is preferably placed about the blade ring or blade segment assemblies by casting, using an appropriate mold. The preferred ceramic for this purpose has been found to be a hydraulic-setting fused silica, such as is commercially available from Thermo Materials Corporation under the trade name "THERMOSIL Castable 120". Other suitable ceramic materials include other fused silica materials which retain their strength at elevated temperatures, and can be cast to shape with low shrinkage. The ceramic should have appropriate properties, such as ease of fabrication, rapid solidification, compressive strength of greater than 5000 psi when cured, high temperature capabilities such as to withstand the temperatures and pressures of forge bonding, suitable coefficient of expansion for the purpose for which it will be used, and the capability of being easily broken away or separated from the blade ring or blade segment assembly upon completion of the forge bonding procedure. It should be noted that the compressive strength of the ceramic material is not the limiting property in its use, since the ceramic is supported and confined by rigid dies during forging.

Figure 6:
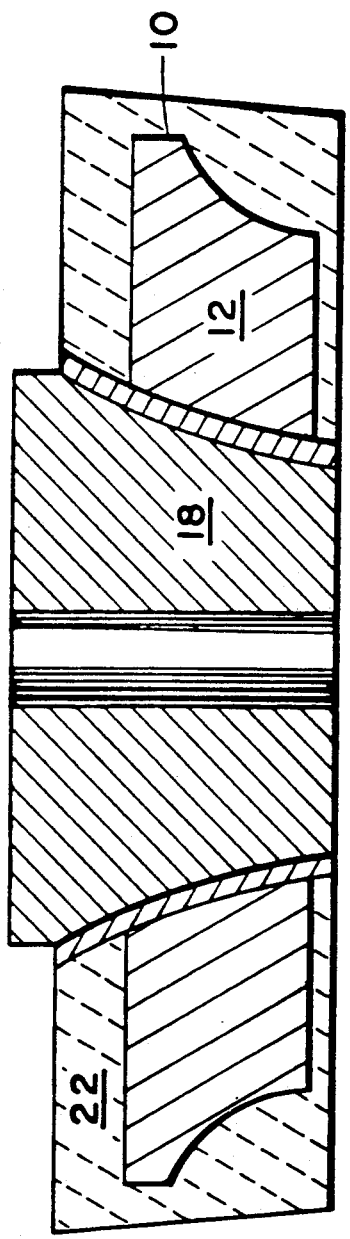
FIG. 6 shows a cross-sectional view of a bladed ring and disk preform with a protective ceramic shell in place.

As shown in FIG. 6, the wrought disk preform 18, having blade ring assembly 10 positioned thereabout, is now encompassed by a cast ceramic shell 22, which serves as a filler, capable of transferring forging loads to the die. In one form of forging means, a cylindrical can of appropriate diameter may be used to hold the blade ring assembly and the disk in contacting relation during the bonding process. Prior to the application of pressure to the components, all oxygen and other contaminants such as moisture are removed from the surfaces to be bonded, and these surfaces are maintained contaminant-free throughout the bonding process. For example, removal of contaminants may be accomplished by hot vacuum outgassing and sealing the can.

Figure 7:
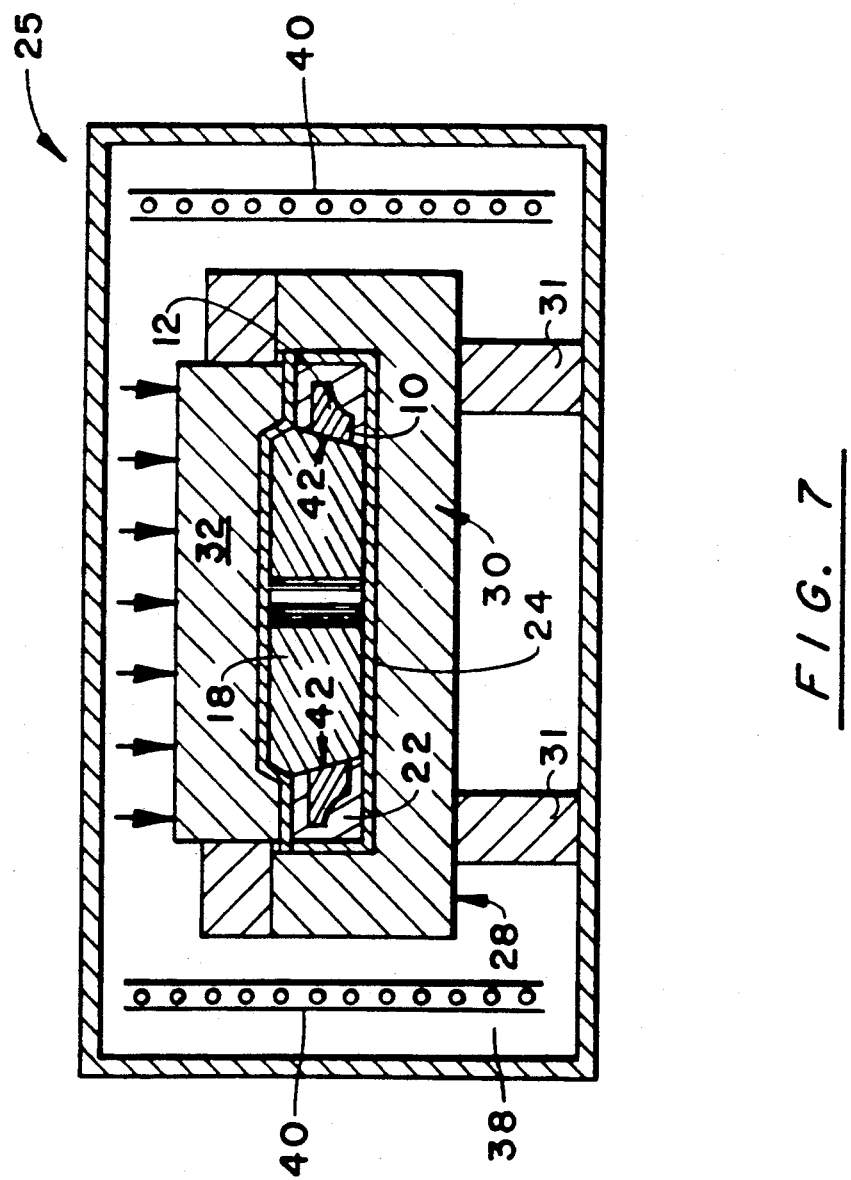
FIG. 7 is a cross-sectional view of one form of forging press operating upon the elements of FIG. 6 to bond them together.

The evacuated can, 24, with disk preform and blade elements therein, is placed within a press, 25, as illustrated in FIG. 7. The term "press" as used in this specification and appended claims is intended to encompass any device for forcing the components together under very high pressure, such as apparatus for hot isostatically pressing the components or a forging press. The components are heated within the press to a temperature sufficient to put at least the disk preform in a superplastic condition. Sufficient pressure is then applied to the components to cause the disk preform to superplastically deform at its bonding surface to create line-on-line contact over the entire bonding surfaces of the blade assembly. A high pressure and temperature are held until a solid state diffusion bond is achieved. The tooling 28, as illustrated, has a lower fixed die 30 and an upper movable die 32. The lower die is held in position by supports 31. The forging tooling 28 is disposed within a chamber 38 of the press 25, and is surrounded by heating elements 40. The chamber is evacuated to protect the dies from oxidation. The blade ring assembly 10, ceramic shell 22, and disk preform 18 are heated to a temperature sufficient to put the disk preform into a condition of superplasticity. For a material such as AF2-IDA, this would be between about 2025° and 2075° F. Since the blades, 12, are made from single crystal material, they would normally be subjected to elastic deformation, as opposed to plastic deformation, during this step. However, the presence of the ceramic shell, supported by the forging die set, serves to limit deformation of the blades, and to prevent damage thereto resulting from such deformation.

Once the required upset temperature is reached, the upper die 32 is forced toward the lower die 30 using sufficient pressure such that, due to the superplastic condition of the disk preform, deformation of the preform material occurs at the bonding interface 42. An upset is excess of 5 percent (with respect to axial thickness of the preform) is preferred in the forging operation. Forging pressures in excess of 15,000 psi are preferred. At such pressures, the disk preform material acts like a fluid, i.e. a superplastic deformation occurs. Pressures considerably less than 15,000 psi may be satisfactory. After upsetting the preform, the temperature is raised, if necessary, to the desired diffusion bonding temperature. The pressure is maintained, and the temperature is held until a solid state diffusion bond is achieved at the interface 42. This may require two or more hours, depending upon the materials, temperatures, and pressures used.

Figure 8:
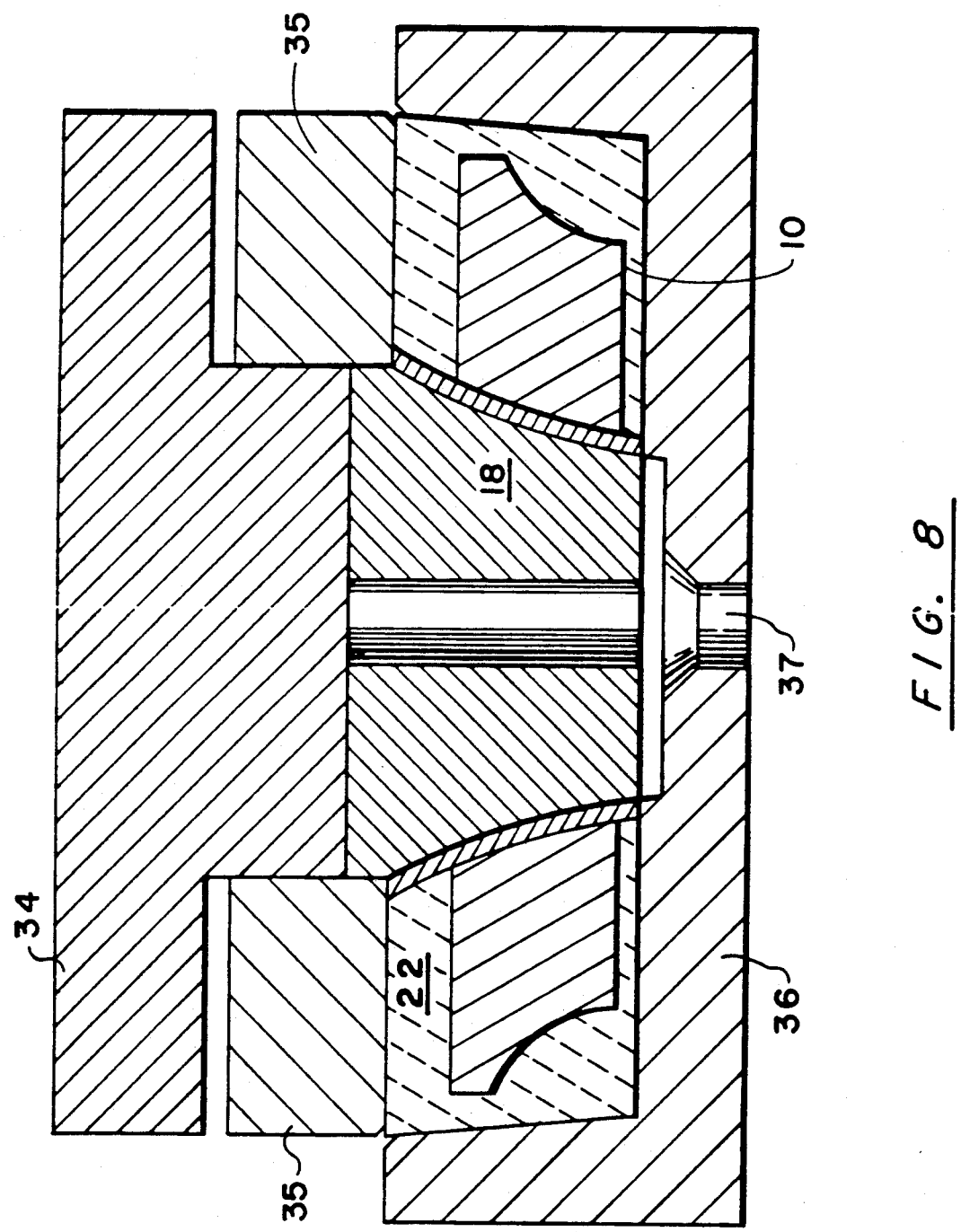
FIG. 8 is a simplified illustration of a bladed ring, disk, and ceramic shell assembly positioned for bonding in an alternative forging die set.
Figure 9:
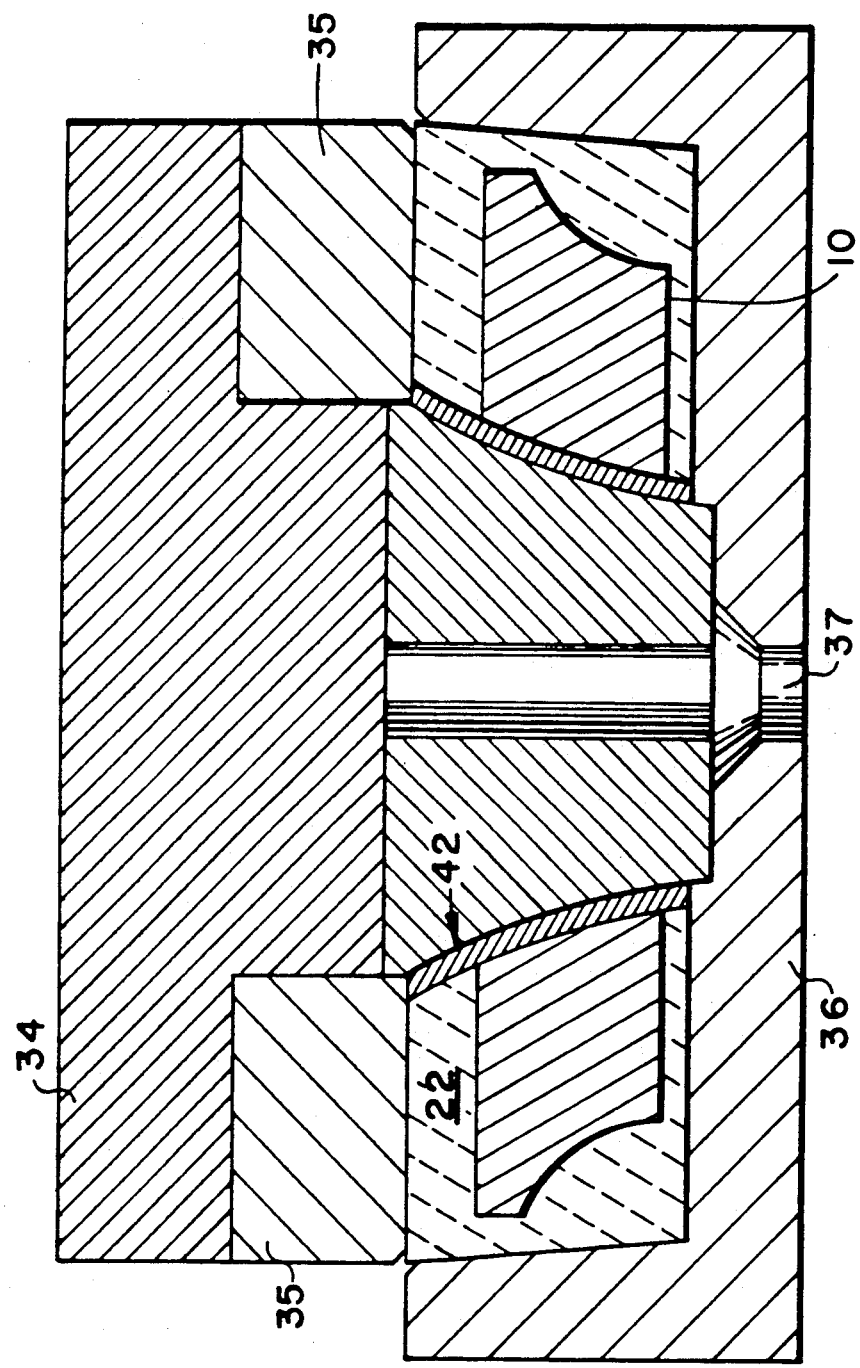
FIG. 9 illustrates the bladed ring bonded to the disk before removal from the forging die.

A simplified illustration of an alternative forging tooling is shown in FIG. 8, wherein the bladed ring assembly 10, disk preform 18, and ceramic shell 22 are disposed between a two piece forging punch, 34 and 35, and a forging die 36 with knockout 37. During forging, the forge die set and parts are as shown in FIG. 9, and diffusion bonding occurs at interface 42.

For most materials the upset and diffusion bonding temperatures are the same. However, for some powder metallurgy materials, such as IN-100, carbides tend to form at free surfaces at the preferred diffusion bonding temperature. In such cases, it is preferred to upset the disk preform at a lower temperature within the superplastic temperature range, below that temperature at which carbides form. For IN-100, the preferred upsetting temperature range is from 1800° to 1850° F. After upsetting, the temperature is raised to between 1975° and 2000° F.

Figure 10:
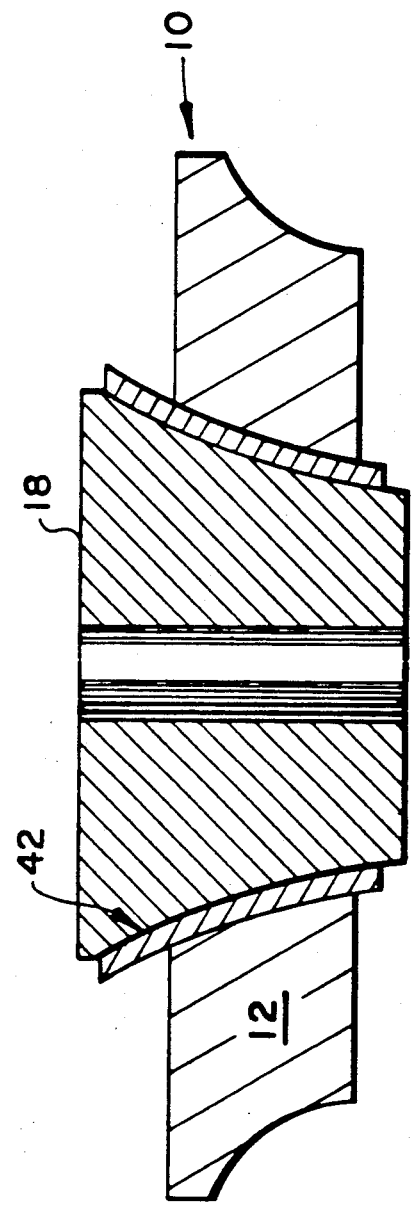
FIG. 10 illustrates the bonded blade ring and disk after removal from the forging die and removal of the ceramic shell.

The upset disk 18 and blade ring 10 are now an integral assembly, which can be removed from the forging press. It will be appreciated that some or considerable shaping of the disk preform may have been accomplished during the forging/diffusion bonding step by using appropriately configured upper and lower dies 30 and 32, or 34 and 36. After removal of the cast ceramic shell, which may be broken away or machined away, depending upon specific ceramic material employed, the assembly may be further machined as necessary. Further machining of the disk may also be done, as is required. It is also noted that, in machining the blades, the diffusion bonded areas between adjacent blade elements may be machined away, leaving only single crystal airfoils 12 of the appropriate crystallographic orientation, integrally attached at bond line 42 by solid state diffusion bonds to the rim of the wrought superalloy disk 18, as shown in FIG. 10. At this point, passageways may be opened between the air cooling passages in the blades and the plenum chambers located within the disk rim (not illustrated). This may be accomplished, for example, by a modified electrochemical milling technique utilizing a shaped glass tube, sometimes referred to as stem-drilling.

After diffusion bonding the blade ring to the disk, and before or after machining or otherwise forming and/or perfecting airfoils in the blade ring, the integral assembly is heat treated to the desired strength and hardness for the materials used. It must be noted that the materials were degraded when processed to cause the disk preform to exhibit superplastic properties and during the bonding operation.

EXAMPLE OF THE INVENTION:

Individually cast single crystal nickel-base superalloy blades are fixtured in their correct rotor positions while a continuous ring of Mar-M-247 alloy is cast about the root (radially inward) portions of the array of blades. The cast ring of Mar-M-247 serves to hold the positions of the individually cast blades once their fixturing is removed. This "bi-cast" ring consisting of individually cast blades and a Mar-M-247 ring is then machined at its inner diameter to remove excess Mar-M-247 and expose blade root material at the inner diameter surface of the ring. Once machined, the bladed ring is ready to assemble with an AF2-IDA alloy disk whose outer diameter mates with the machined inner diameter of the ring. The bladed ring/disk assembly is then sealed at the edges of the circumferential interface between the ring and disk. The sealing operation is achieved by electron beam welding, which is performed in a vacuum environment so that the interface itself is evacuated as a result. The sealed assembly is then placed in a simple cylindrical mold, made of aluminum. Steel, plastic, or other materials could also be used for this mold. A castable ceramic material is prepared and poured about the blades at the periphery of the assembly within the cylindrical mold. The ceramic casting process is performed at ambient temperature and the cast assembly is ready for curing in 48 hours. Curing of the assembly, with mold removed, requires an additional 24 hours at 250° F. After curing, the ceramic shell outer diameter is machined to match the forging die set in which the assembly will be bonded. The forging die set is installed in the working area of an isothermal forging press. The ceramic shell/blade ring/disk assembly is transferred into position in the lower die, using the standard part transferral mechanisms within the press. Once in position, press load is applied to achieve a 15 ksi stress while at 2050° F. for a 2-hour time period. Press load is then removed, and the part ejected from the die and withdrawn from the press. The ceramic shell is broken away mechanically, and the bonded part is ready for inspection, heat treatment, and machining operations.

It is to be understood that the above description of the present invention is susceptible to considerable modification, change, and adaptation by those skilled in the art, and that such modifications, changes, and adaptations are to be considered within the scope of the present invention, which is set forth by the appended claims.

We claim:

1. A method for fabricating an integrally bladed rotor having blades made from a first material having a predetermined desired crystallographic grain orientation, said blades being integral with a disk made from a superalloy having different properties than said first material, wherein said blades are bonded directly to said disk, said method including the steps of:

fabricating said disk by processing a disk preform made of said superalloy material in such a manner that said disk preform becomes superplastic at elevated temperatures, including forming a radially outwardly facing first bonding surface thereupon;

fabricating a blade ring assembly comprising a ring provided with an annular array of radially extending blades of said first material, such that said blade ring assembly has a radially inwardly facing second bonding surface adapted to mate with said first bonding surface of said disk preform;

positioning said blade ring assembly accurately about the periphery of said disk preform with the inwardly facing second bonding surface of said blade ring assembly in mating contact with the first bonding surface of said disk preform;

encasing said blade ring assembly in a protective shell of a ceramic material, and disposing said blade ring assembly, protective shell, and disk preform within a supporting forging die set;

heating said blade ring assembly, protective shell, and disk preform within said forging die set and simultaneously applying pressure thereto to obtain:

a. superplastic deformation of said disk preform at the interface of said first and second bonding surfaces and b. a solid state diffusion bond at said interface to form an integral assembly;

removing said integral assembly from said forging die set, and removing said ceramic material;

machining said integral assembly so as to obtain the desired configuration; and heat treating said integral assembly to obtain the desired strength and hardness in the materials thereof.

2. The method of claim 1 including, prior to the step of heating and applying pressure to said components, the step of removing oxygen and moisture from the surfaces to be bonded together.

3. The method of claim 2 wherein the step of heating and applying pressure comprises hot isostatically pressing said blade ring assembly, protective shell, and disk preform.

4. The method of claim 2 wherein said step of heating and applying pressure includes forging under isothermal conditions to obtain the superplastic deformation of said disk preform at said interface.

5. The method of claim 2, wherein said blade ring assembly is fabricated of individual blade elements, and said blade elements are fabricated from single crystal material.

6. The method of claim 5, wherein said individual blade elements are each formed into the shape of an airfoil prior to positioning said elements about said disk preform, and said airfoils and said disk preform each comprise cooling passages.

7. The method of claim 6, further comprising the step of drilling passageways between said cooling passages in said blades and said disk after forming said solid state diffusion bond.

8. The method of claim 2, wherein said blade ring is fabricated of cast nickel-base superalloy.

9. The method of claim 2, wherein said ceramic material supports the blade ring within the forging die during said step of heating and applying pressure to said components.

10. The method of claim 9, wherein said ceramic material is a hydraulically setting fused silica.

11. The method of claim 9, wherein said ceramic material is an air-setting silica grain/non-hydraulic binder material.

12. The method of claim 2, wherein said disk preform is a Wrought superalloy.

13. The method of claim 2, wherein said blades comprise a single crystal alloy.

14. In a method for joining a first element made from a first superalloy material to a second element made from a second superalloy material which is a different material than said first material, including the steps of:

processing said first material such that it exhibits superplasticity during a subsequent step of heating and pressure application, and fabricating said first element from first material thusly processed, said first element having a radially outwardly disposed bonding surface, and said second element having a radially inwardly disposed bonding surface for mating with the bonding surface of the first element;

positioning said first and second elements within a press such that their bonding surfaces are in mating contact;

heating said first and second elements within said press and simultaneously applying pressure thereto to obtain a. superplastic deformation of said first element at its bonding surface where it mates with the bonding surface of said second element to create contact of said bonding surfaces, and b. solid state diffusion bond between said bonding surfaces to form an integral assembly; and heat treating said integral assembly;

the additional step of encasing at least said second element within a ceramic shell prior to positioning said elements within said press.

15. The method according to claim 14, wherein said step of positioning comprises positioning said elements within a forging press, and said step of heating and applying pressure comprises forging under isothermal conditions to obtain said superplastic deformation.

16. The method according to claim 15, wherein said ceramic material is a hydraulically setting fused silica.

17. The method of claim 15, wherein said ceramic material is a silica grain/non-hydraulic binder air-setting material.

18. The method of claim 15, wherein said first element comprises a rotor disk and said second element comprises a blade ring assembly.

19. The method of claim 18, wherein said first superalloy material is a wrought superalloy.

20. The method of claim 19, wherein said blade ring assembly is a bi-cast blade ring wherein the blades comprise single crystal alloy.

21. The method of claim 20, wherein said single crystal alloy blades are bi-cast to a ring of nickel-base superalloy.

22. The method of claim 15, wherein said ceramic material will not plastically deform during said step of heating and applying pressure.

23. The method of claim 15, wherein said first and second elements comprise cooling passageways.

24. The method of claim 23, further comprising the step of opening a passage between the cooling passageways of said first and second elements.

* * * * *

UNITED STATES PATENT AND TRADEMARK OFFICE
CERTIFICATE OF CORRECTION

PATENT NO. : 5,113,583

DATED : May 19, 1992

INVENTOR(S) : Steven D. Jenkel et al

It is certified that error appears in the above-identified patent and that said Letters Patent is hereby corrected as shown below:

In column 4, line 41, after "blade ring," insert --11,--.
In column 9, line 50, change "2" to --12--.

Signed and Sealed this

Fourteenth Day of September, 1993

Attest:

BRUCE LEHMAN

*Attesting Officer*    Commissioner of Patents and Trademarks